UNITED STATES PATENT OFFICE.

CHRISTIAN F. PAUL, JR., OF AUSTIN, TEXAS, ASSIGNOR TO ERNEST NALLE, W. P. ALLEN, AND ED ROSENGREN, TRUSTEES, OF AUSTIN, TEXAS.

COMBINED THRUST-BEARING AND DRIVING MECHANISM.

1,407,296.      Specification of Letters Patent.      Patented Feb. 21, 1922.

Application filed June 15, 1921. Serial No. 477,860.

*To all whom it may concern:*

Be it known that I, CHRISTIAN F. PAUL, Jr., a citizen of the United States of America, residing at Austin, in the county of Travis and State of Texas, have invented certain new and useful Improvements in Combined Thrust-Bearing and Driving Mechanisms, of which the following is a full, clear, and exact description.

This invention relates to devices for taking the thrust due to the weight of a heavy mass rotating at high speed, such as the rotating head of a centrifugal separator, for example the separator described in my co-pending application Serial No. 477,858. The invention also relates to devices for starting and driving heavy bodies of the kind indicated, to bring them up to the high speed required without excessive stresses on the driving mechanism, motor, connecting gearing, and the like, and to keep them running smoothly after they have been brought up to speed. The chief object of the invention is therefore to provide a combined thrust-bearing and driving mechanism of simple and durable character. To these and other ends the invention consists in the novel features hereinafter described.

One form of the invention is illustrated in the accompanying drawing, in which

Figure 1:
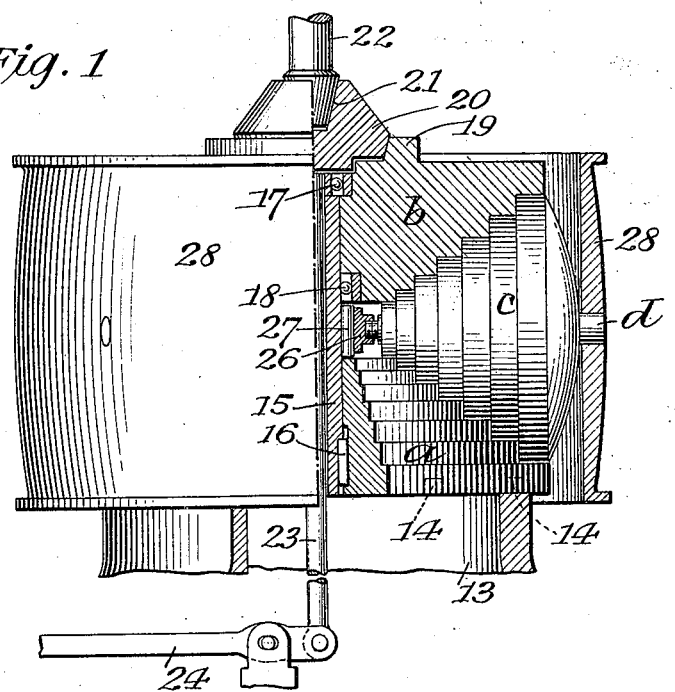
Fig. 1 is a side view of the apparatus, partly in vertical section on line 1—1 of Fig. 2.
Figure 2:
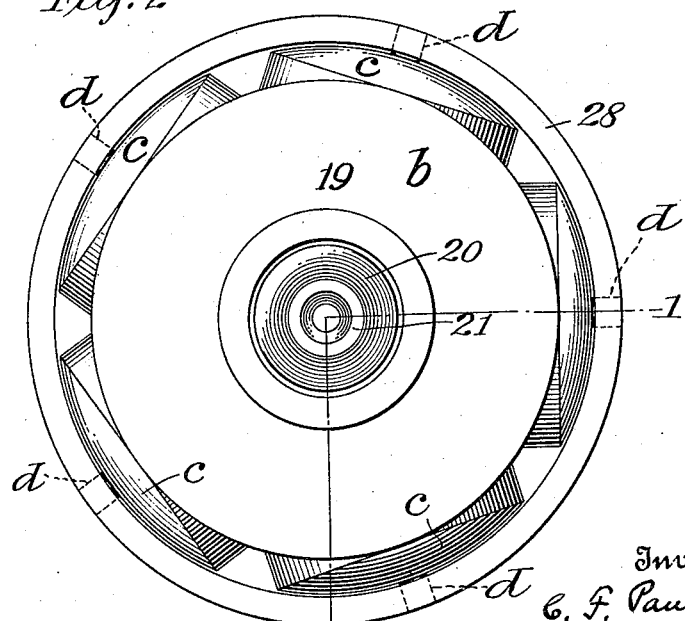
Fig. 2 is a plan view.

The apparatus illustrated comprises, generally, an upwardly tapering stepped cone $a$, a downwardly tapering stepped cone $b$, above the first and co-axial therewith, and a plurality of radially arranged inwardly tapering stepped cones $c$ between the other two and cooperating therewith. The lower stepped cone, which is stationary and which serves to support the other parts of the apparatus, is itself supported in any convenient manner, as on a hollow pedestal 13 provided with a circumferential series of studs 14 extending into corresponding apertures in the bottom of the cone to prevent rotary movement of the latter. The upper and lower cones are provided with axial openings to receive a tubular stem 15 to which the lower cone is fixed, as by means of a key 16.

The upper cone revolves around the stem 15, and may be provided with ball bearings 17, 18. In the top of the upper cone is an internally tapered rib or collar 19 constituting the female member of a friction clutch, to receive the downwardly tapered male clutch member 20, which is provided with a tapered socket 21 to receive the correspondingly tapered lower end of a shaft or stud 22. This shaft or stud may be taken to represent the load which is to be supported and driven.

The clutch member 20 is disengaged from the other by means of a clutch-release rod 23 extending up through the hollow stem 15 and at its lower end connected with an actuating lever 24.

The radial cones $c$, preferably five in number, are spaced apart equiangularly and are mounted to rotate on radial shafts or spokes $d$ (provided, if desired, with ball-bearings, not shown, at each end) having their inner ends screwed or otherwise fitted into the annular race 26 of a roller bearing 27 around the hollow stem 15. The outer ends of the radial shafts are removably but snugly fitted into apertures in an annular housing 28 which preferably encloses the upper and lower cones as well as the radial cones. This housing is the element to which the driving energy is transmitted (from any suitable prime mover, not shown) and may be in the form of a pulley, as indicated, to receive and be driven by a belt. It will be observed that in the embodiment illustrated the pulley housing is supported by the radial shafts $d$. The latter are themselves supported by the radial cones $c$, which roll on and are supported by the stationary lower cone $a$.

When it is desired to start the load (represented by the shaft or stud 22) the clutch 20—19 is released by rocking lever 24, thereby raising the clutch cone 20 out of its socket. The outer ring or housing 28 is now started and brought up to speed, thereby rolling the radial cones $c$ on the fixed lower cone $a$. The weight of the upper cone gives sufficient frictional engagement with the revolving and rotating radial cones, so that the former partakes of their motion and is caused to rotate about the tubular stem 15. The clutch-release rod 23 is now lowered to let in the clutch gradually. As the clutch begins to take hold the load starts to rotate, slowly at first, the clutch itself slipping, or the cone $b$ slipping on the radial driving cones, or both. But as the clutch is seated, more and more energy is delivered to the load, the latter being accelerated as the slippage decreases, until finally the inertia of the load is overcome and the shaft 22 rotates at full speed. The thrust due to the weight of the load is now taken by the cones $a$, $b$, $c$, and this thrust so increases the friction between the rolling surfaces that but little if any slippage occurs, with the result that the upper cone $b$ and the shaft 22 rotate at the same speed, which is, theoretically, twice the speed of the pulley 28, as shown by the following analysis:

Let $N_c$=angular speed of cone $c$ about its own axis; $N_d$=angular speed of pulley 28, which of course is the same as the angular speed of revolution of shaft $d$ about the hollow shaft 15; $N_b$=angular speed of cone $b$; $N_{b_1}$=angular speed of cone $b$ due to rotation of cone $c$ on axis $d$; $N_{b_{11}}$= angular speed of cone $b$ due to revolution of cone $c$ (or shaft $d$) around shaft 15; $D_a$=diameter of cone $a$; $D_b$=diameter of cone $b$; $D_c$=diameter of cone $c$. Then, disregarding possible slippage, and remembering that cone $c$ rolls on stationary cone $a$, $$N_c : N_d :: D_a : D_c \quad\quad (1).$$

Or, $$N_c = N_d \frac{D_a}{D_c} \quad\quad (2).$$

Assuming that cone $c$ is rotating on a stationary axis and is driving cone $b$, then, evidently, $$N_{b_1} = N_c \frac{D_c}{D_b} \quad\quad (3).$$

Assuming that cone $c$ revolves about the axis of cone $b$ but does not rotate on its own axis, $d$, then $$N_{b_{11}} = N_d \quad\quad (4).$$

Since the total speed $N_b$ of cone $b$ is the sum of the components $N_{b_{11}}$ and $N_{b_1}$, $$N_b = (4) + (3) = N_d + N_c \frac{D_c}{D_b} \quad\quad (5).$$

Substituting in (6) the value of $N_c$ as found in (2), $$N_b = N_d + N_d \frac{D_a}{D_c}\left(\frac{D_c}{D_b}\right) \quad\quad (6).$$

Or, $$N_b = N_d \frac{D_a + D_b}{D_b} \quad\quad (7).$$

Hence, in general, the speed of cone $b$ is independent of the diameter of cone $c$ but depends (in part) upon the ratio of the diameters of the upper and lower cones, $b$ and $a$. In the present embodiment this ratio is unity, since the two diameters are equal, and hence (from equation 7)

$$N_b = N_d + N_d = 2N_d \quad\quad (8).$$

That is, if cone $b$ is the inverted counterpart of cone $a$, as in the construction illustrated, the speed or R.P.M of cone $b$ and shaft 22 (assuming no slippage) will always be twice the R.P.M. of the driving element or pulley 28.

From the foregoing description it will be seen that my invention provides a roller thrust-bearing, a driving mechanism, and a speed-multiplying mechanism, and that the friction due to the thrust of the load is utilized to enable the mechanism to drive the load. The driving energy imparted to the driving element or pulley 28 revolves and rotates the radial cones $c$ which in turn act as transmitting elements and transmit the energy to the driven element or cone $b$.

It is to be understood that the invention is not limited to the construction herein specifically illustrated and described but can be embodied in other forms without departure from its spirit.

I claim:

1. In a combined thrust-bearing and driving mechanism, a stationary element, a plurality of transmitting elements rolling on the stationary element and about a common axis, a driven element bearing upon the transmitting elements and rotated by the latter about said axis, means for revolving the transmitting elements around said axis, a friction clutch associated with said driven element, and means, including a stem extending through said driven element at the axis thereof, to release the clutch.

2. In a combined thrust-bearing and driving mechanism, a stationary lower element having a vertical axis, a plurality of transmitting elements revoluble around said axis and engaging the lower element for rotation on their own axes, means for revolving the transmitting elements, an upper element bearing upon the transmitting elements and rotatable by engagement therewith about the axis of the lower element, a friction-clutch member carried by the upper element, a friction clutch-member adapted to engage the other by gravity, a clutch release rod extending through the upper and lower elements to raise the second clutch member out of engagement with the first, and means for actuating said rod.

3. In a combined thrust-bearing and driving mechanism, a stationary vertical shaft, a lower element fixed to the shaft and coaxial therewith, an inner ring above said element and rotatable about said shaft, an outer driving ring spaced radially from the first and rotatable about said shaft, a plurality of radial shafts journaled in said rings, a plurality of transmitting elements mounted on the radial shafts and rotated by engagement with the lower element as the radial shafts are revolved about the vertical shaft by the rotation of the driving ring, and an upper element rotatable about the vertical shaft and supported upon and rotated by said transmitting elements.

4. In a combined thrust-bearing and driving mechanism, a stationary upwardly tapering lower cone, and a support therefor; a plurality of transmitting cones revoluble about the axis of the lower cone and rotatable on their own axes by rolling engagement with said lower cone, said transmitting cones being supported by the lower cone and having radial shafts; a driving ring encircling the transmitting cones and supported by the shafts thereof; and an upper cone supported by the transmitting cones rotated by rolling engagement therewith, a friction clutch associated with the upper cone, and means for disengaging and gradually engaging said clutch at will.

5. In a combined thrust-bearing and driving mechanism, a stationary upwardly tapering lower cone and a support therefor; a plurality of transmitting cones revoluble about the axis of the lower cone and rotatable on their own axes by rolling engagement with said lower cone, said transmitting cones being supported by the lower cone and having radial shafts; a driving ring encircling the transmitting cones and supported by the shafts thereof; an upper cone supported by the transmitting cones and rotated by rolling engagement therewith; a friction-clutch member on the upper cone for rotation thereby, a friction-clutch member above the first and engageable therewith by gravity, a vertically movable clutch-release rod extending through the lower and upper cones at the axis thereof, and means for raising and lowering the clutch release rod to lift the upper clutch member out of engagement with the other and to permit gradual re-engagement of the two, at will.

6. In a combined thrust-bearing and driving mechanism, a stepped, stationary, upwardly tapering lower cone; a rotatable stepped cone inverted over the lower cone and co-axial therewith; a plurality of stepped transmitting cones between the upper and lower cones to support and rotate the upper cone, said transmitting cones being themselves supported by the stationary lower cone; and means supported by the transmitting cones and connected therewith to revolve the same about the axis of the upper and lower cones.

7. The structure described in claim 6, in combination with means operable at will to gradually connect a load with the upper cone for support and rotation thereby.

8. In a combined thrust-bearing and driving mechanism, a stationary lower supporting element and a rotatable upper element in the form of stepped cones arranged in axial alignment, and revolving and rotating devices in the form of stepped cones between said elements to support the upper element and rotate the same at a speed greater than their own speed of revolution, and means for revolving said devices about the axis of the upper element.

In testimony whereof I hereto affix my signature.

CHRISTIAN F. PAUL, Jr.